United States Patent
Wu et al.

(10) Patent No.: US 10,122,638 B2
(45) Date of Patent: Nov. 6, 2018

(54) NETWORK DEVICE AND CONTROLLING METHOD THEREOF

(71) Applicant: Realtek Semiconductor Corporation, Hsinchu (TW)

(72) Inventors: Chun-Da Wu, Hsinchu (TW); Hong-June Hsue, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 146 days.

(21) Appl. No.: 15/186,532

(22) Filed: Jun. 19, 2016

(65) Prior Publication Data

US 2017/0155591 A1    Jun. 1, 2017

(30) Foreign Application Priority Data

Nov. 30, 2015 (TW) .............................. 104139957 A

(51) Int. Cl.
| | | |
|---|---|---|
| *H04L 29/12* | (2006.01) | |
| *H04L 12/743* | (2013.01) | |
| *H04L 12/721* | (2013.01) | |
| *H04L 12/851* | (2013.01) | |
| *H04L 12/931* | (2013.01) | |
| *H04L 9/00* | (2006.01) | |

(52) U.S. Cl.
CPC .......... *H04L 47/2441* (2013.01); *H04L 45/38* (2013.01); *H04L 45/7453* (2013.01); *H04L 49/70* (2013.01); *H04L 61/2007* (2013.01); *H04L 61/6022* (2013.01)

(58) Field of Classification Search
CPC .................................. H04L 12/56; H04L 9/00
USPC .................................................. 370/252–392
See application file for complete search history.

(56) References Cited

U.S. PATENT DOCUMENTS

| | | | |
|---|---|---|---|
| 9,465,619 B1 * | 10/2016 | Rottenstreich | G06F 9/46 |
| 2008/0112415 A1 * | 5/2008 | Sobaje | H04L 47/10 370/392 |
| 2013/0294449 A1 * | 11/2013 | Kim | H04L 43/026 370/392 |

OTHER PUBLICATIONS

Open Networking Foundation, "Open Flow Switch Specification", Open Networking Foundation, Dec. 19, 2014, Version 1.5.0.

* cited by examiner

*Primary Examiner* — Iqbal Zaidi
(74) *Attorney, Agent, or Firm* — CKC & Partners Co., Ltd.

(57) ABSTRACT

A network device includes a packet classifying unit and a packet processing unit. The packet processing unit includes processors coupled in series. Each processor includes a storage unit and an operating unit. Data packets are classified into packet types corresponding to different pipelines by the packet classifying unit. The storage unit stores characteristic values and operation data corresponding to different pipelines. The operating unit processes data packets output from the previous stage (e.g., classified data packets) in accordance with their packet types, characteristic values and the corresponding operation data.

18 Claims, 8 Drawing Sheets

NETWORK DEVICE AND CONTROLLING METHOD THEREOF

RELATED APPLICATIONS

This application claims priority to Taiwan Application Serial Number 104139957, filed Nov. 30, 2015, which is herein incorporated by reference.

BACKGROUND

Technical Field

The present disclosure relates to a network device. More particularly, the present disclosure relates to a hybrid Open-Flow network device and controlling method thereof.

Description of Related Art

In recent years, the most popular network architecture is software-defined networking (SDN), the core technology of which is the OpenFlow network architecture. The OpenFlow network architecture enables managers to program a network to implement flexible network flow control without changing hardware devices.

For managers, although the OpenFlow network architecture has many advantages, there are still some existing features of a traditional network switch that cannot be fully replaced by the OpenFlow network architecture. Accordingly, traditional practice integrates the pipeline which is used for processing data packets of a traditional network switch with the pipeline of an OpenFlow switch into the same network switch, i.e., into an OpenFlow-Hybrid switch.

Generally, the pipelines of a traditional switch and an OpenFlow switch are two sets of pipelines that operate independently. Accordingly, during actual use of the aforementioned OpenFlow-Hybrid switch, two pipeline circuits are required to support a traditional operation and an OpenFlow operation separately. However, the use of two pipeline circuits results in a substantial increase in chip area, leading to high power consumption and an increase in the cost of the chip.

SUMMARY

The present disclosure provides a network device including a packet classifying unit and a packet processing unit. The packet classifying unit receives a data packet and classifies the data packet into a first packet type corresponding to a first pipeline or a second packet type corresponding to a second pipeline. The packet processing unit includes plural processors coupled in series, each of which comprises a storage unit and an operating unit, and receives an output data packet from a previous stage. The storage unit stores plural first characteristic values and first operation data conforming with the first pipeline, and stores plural second characteristic values and second operation data conforming with the second pipeline, in which the first characteristic values correspond to the first operation data respectively, and the second characteristic values correspond to the second operation data respectively. If the output data packet from the previous stage is consistent with at least one of the first characteristic values, the operating unit processes the output data packet according to the corresponding first operation data of the at least one of the first characteristic values. If the output data packet is consistent with at least one of the second characteristic values, the operating unit processes the output data packet according to the corresponding second operation data of the at least one of the second characteristic values.

The chip area of an electronic device can be minimized effectively by the sharing/multiplexing of the storage unit, such that the cost of chip can be reduced.

DETAILED DESCRIPTION

Figure 1:
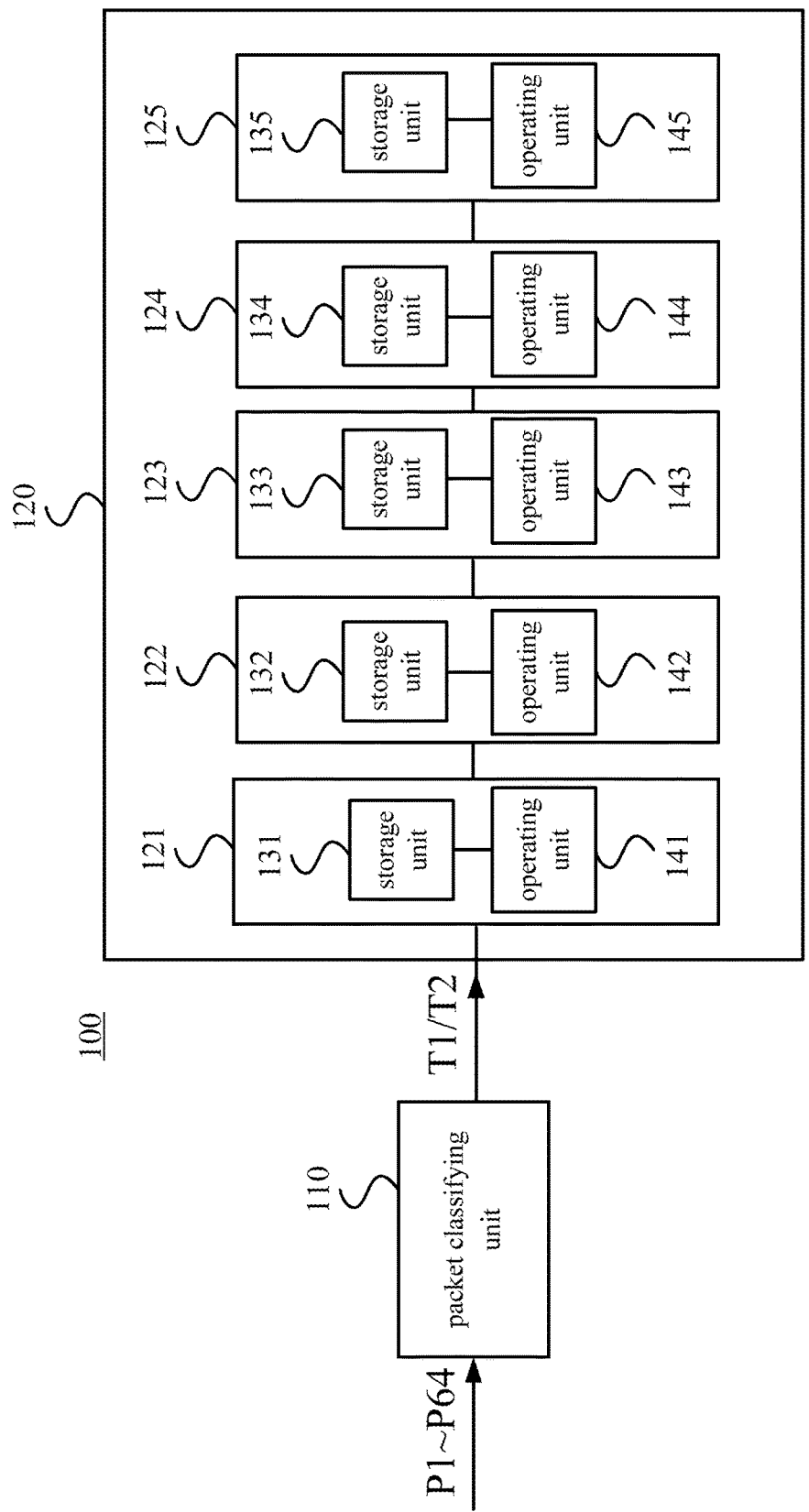
FIG. 1 is a schematic diagram of a network device according to an embodiment of this disclosure.

FIG. 1 is a schematic diagram of a network device 100 according to an embodiment of this disclosure. The network device 100 includes a packet classifying unit 110 and a packet processing unit 120. The network device 100 can be a switch, a router, or any network device equipped with the ability of processing data packets, and in practical applications, the network device 100 further includes circuits such as a computer processing unit (CPU), an arithmetic logic unit (ALU), and/or a flash memory.

The packet classifying unit 110 receives data packets P1-P64, and classifies each one of the data packets P1-P64 into a data packet of packet type T1 or T2. More specifically, the packet classifying unit 110 classifies each one of the data packets P1-P64 into a data packet of packet type T1 or T2 according to the port information, virtual local area network information, IP address, or MAC address of the corresponding one of the data packet P1-P64, or any combination thereof.

In some embodiments, data packets output from the packet classifying unit 110 comprise at least one characteristic value, and said characteristic value is used for determining whether the data packets belong to packet type T1 or T2.

In some embodiments, the data packets P1-P64 may come from different ports, so that the data packets P1-P64 may have information of different ports (e.g., port 21 and port 33). The packet classifying unit 110 classifies the data packets P1-P64 according to the information of the different ports, e.g., classifies the data packets P1-P32 which come from port 21 into packet type T1, and classifies the data packets P33-P64 which come from port 33 into packet type T2.

The packet processing unit 120 is coupled to the packet classifying unit 110 and comprises processors 121-125 which are coupled in series. The processors 121-125 respectively comprise storage units 131-135, and further respectively comprise operating units 141-145. The packet processing unit 120 receives data packets classified by the packet classifying unit 110.

Each of the storage units 131-135 stores characteristic values f1-fn and operation data f1'-fn' (not shown in FIG. 1)

conforming with a first pipeline, and stores characteristic values g1-gm and operation data g1'-gm' (not shown in FIG. 1) conforming with a second pipeline, where n and m of each storage unit are both positive integers that may be the same or different. For example, the first pipeline may be a traditional pipeline, the second pipeline may be an OpenFlow pipeline, and the operation data f1'-fn' and the operation data g1'-gm' correspond to instructions/procedures required by data packets of the traditional pipeline and the OpenFlow pipeline respectively, in which the instructions/procedures may be discarding data packets, returning data packets or any related instructions/procedures.

The operating units 141-145 are coupled to the storage units 131-135, respectively. The operating units 141-145 process data packets of packet type T1 according to at least one of the operation data f1'-fn', or data packets of packet type T2 according to at least one of the operation data g1'-gm'.

Figure 2:
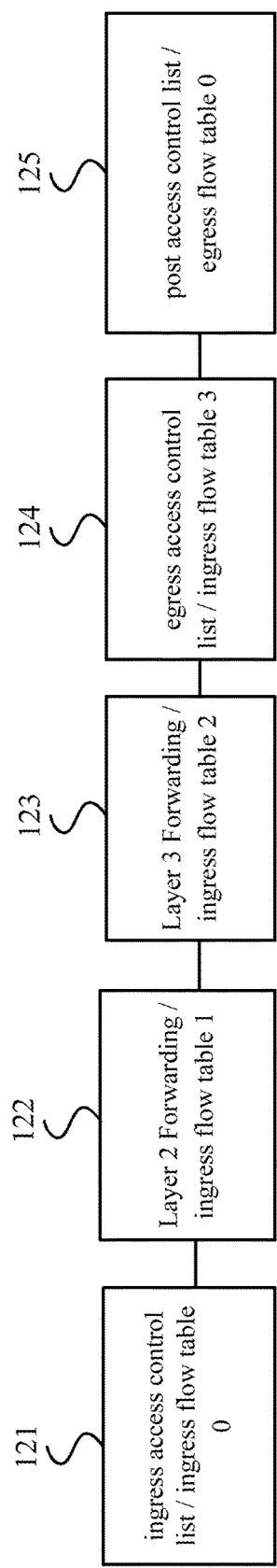
FIG. 2 is a schematic diagram of processors according to an embodiment of this disclosure.

FIG. 2 is a schematic diagram of the processors 121-125 according to an embodiment of this disclosure. The processors 121-125 execute instructions/procedures of different stages of pipelines respectively. In this embodiment, the processor 121 processes ingress access control list (ingress ACL) corresponding to the traditional pipeline and ingress flow table 0 corresponding to the OpenFlow pipeline. The processor 122 processes Layer 2 Forwarding corresponding to the traditional pipeline and ingress flow table 1 corresponding to the OpenFlow pipeline. The processor 123 processes Layer 3 Forwarding corresponding to the traditional pipeline and ingress flow table 2 corresponding to the OpenFlow pipeline. The processor 124 processes egress access control list (egress ACL) corresponding to the traditional pipeline and ingress flow table 3 corresponding to the OpenFlow pipeline. The processor 125 processes post access control list (post ACL) corresponding to the traditional pipeline and egress flow table 0 corresponding to the OpenFlow pipeline.

In one embodiment, because each of the processors 121-125 processes instructions/procedures of specific stages of two pipelines, two pipelines can share the storage units 131-135 and other logic circuits of the processors 121-125 to reduce the cost of the network device 100.

Figure 3A:
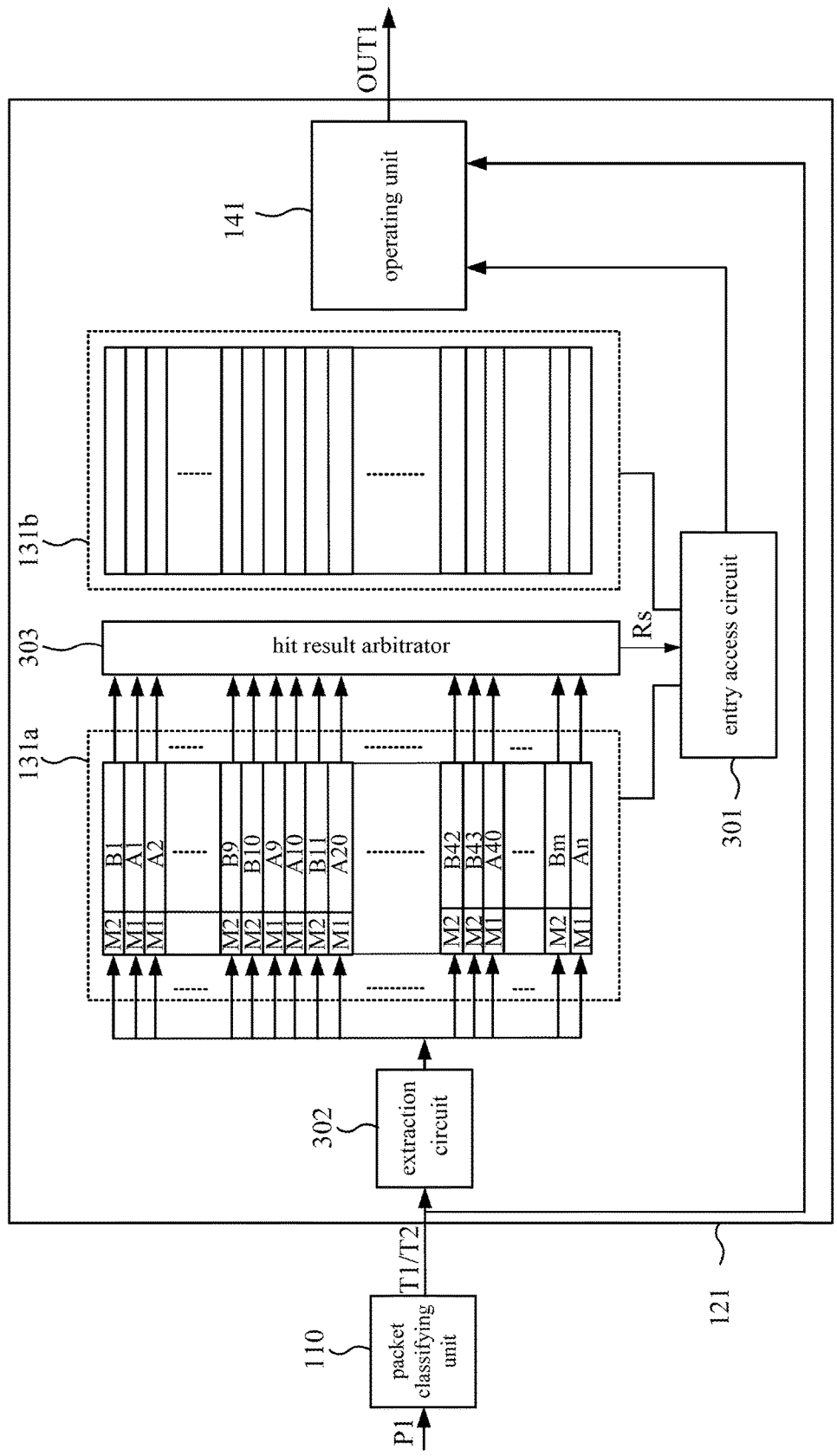
FIG. 3A is a schematic diagram of a processor according to an embodiment of this disclosure.

For example, FIG. 3A is a schematic diagram of the processor 121 according to an embodiment of this disclosure. Although FIG. 3 only shows the processor 121, it should be noted that the architectures of the processors 124-125 are similar to the architecture of the processor 121.

The storage unit 131 comprises storages 131a and 131b. The storage 131a stores characteristic values conforming with different pipelines. The storage 131b stores operation data conforming with different pipelines.

More specifically, the storage 131a comprises entries A1-An and B1-Bm. The entries A1-An and B1-Bm store the characteristic values f1-fn conforming with the first pipeline and the characteristic values g1-gm conforming with the second pipeline respectively. The storage 131b stores the operation data f1'-fn' conforming with the first pipeline and the operation data g1'-gm' conforming with the second pipeline.

In some embodiments, the storage 131a may be a ternary content addressable memory, and the storage 131b may be a static random access memory or any type of memory.

In this embodiment, each of the characteristic values f1-fn conforming with the first pipeline comprises a characteristic value M1, each of the characteristic values g1-gm conforming with the second pipeline comprises a characteristic value M2, and every entry of storage 131a provides a field (e.g., a bit) to store said characteristic value M1 or M2. In some embodiments, the characteristic values M1 and M2 correspond to characteristic values of a traditional pipeline and an OpenFlow pipeline respectively, and this configuration is used to determine which of the traditional pipeline entry and the OpenFlow pipeline entry each entry belongs to.

Figure 3B:
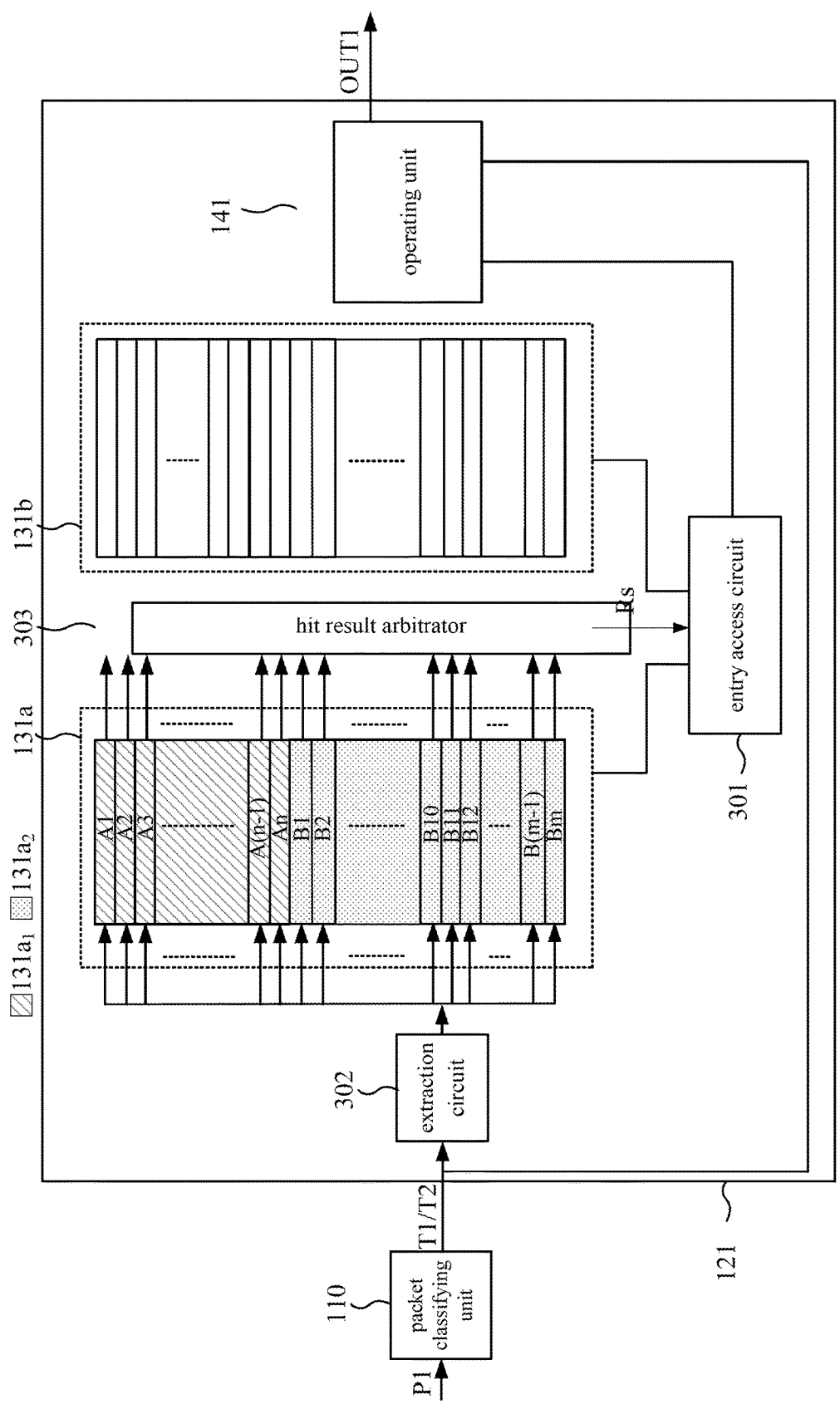
FIG. 3B is a schematic diagram of a processor according to an embodiment of this disclosure.

In some embodiments, the storage unit 131 is not limited to using only the characteristic values M1 and M2 to differentiate entries A1-An from entries B1-Bm. In another embodiment depicted in FIG. 3B, compared with the embodiment shown in FIG. 3A, the storage 131a comprises two independent blocks $131a_1$ and $131a_2$ containing entries A1-An and B1-Bm respectively, in which entries A1-An store the characteristic values f1-fn conforming with the first pipeline, and the entries B1-Bm store the characteristic values g1-gm conforming with the second pipeline. According to this setting, data packets of packet type T1 are only compared with entries A1-An of the block $131a_1$ (e.g., only data packets of packet type T1 are input into the block $131a_1$), and data packets of packet type T2 are only compared with entries B1-Bm of the block $131a_2$ (e.g., only data packets of packet type T2 are input into block $131a_2$).

In the embodiments depicted in FIGS. 3A and 3B, the processor 121 further comprises an entry access circuit 301, an extraction circuit 302 and a hit result arbitrator 303. The entry access circuit 301 is coupled to the storage 131a, the storage 131b, the hit result arbitrator 303 and the operating unit 141, and the extraction circuit 302 is coupled to storage 131a.

The entry access circuit 301 writes/reads the characteristic values f1-fn and g1-gm into/from the storage 131a, and writes/reads the operation data f1'-fn' and g1'-gm' into/from the storage 131b.

The extraction circuit 302 receives data packets classified by the packet classifying unit 110, extracts at least one packet characteristic value of classified data packets, and outputs said at least one packet characteristic value to the storage 131a to be compared with the entries of the storage 131a to generate a comparison result.

The hit result arbitrator 303 generates a match result Rs according to the comparison result. The entry access circuit 301 reads the corresponding operation data in the storage 131b according to the match result Rs. For example, if the match result Rs corresponds to entry A3 (which contains characteristic value f3), entry access circuit 301 reads operation data f3' for the operation unit 141 to process data packets (of packet type T1) based on operation data f3' and to generate output data packet OUT1.

In some embodiments, the hit result arbitrator 303 comprises a mechanism for determining priorities, which enables the hit result arbitrator 303 to determine which entry is the match result Rs if the comparison result corresponds to plurality entries. For example, the priority order of entries preset by the hit result arbitrator 303 is that entry A5 is prior to A1, and so if the comparison result shows entries A1 and A5, the hit result arbitrator 303 outputs the entry A5 as the match result Rs.

In some embodiments, the entry access circuit 301, the extraction circuit 302 and the hit result arbitrator 303 are installed in the processor 121 or installed within the packet processing unit 120 but independent of the processor 121.

By sharing/multiplexing of a storage unit, an entry access circuit, an extraction circuit and a hit result arbitrator of a processor, the chip area of a hybrid OpenFlow network device can be minimized effectively, such that a reduction in power consumption and manufacturing costs are realized.

Figure 3C:
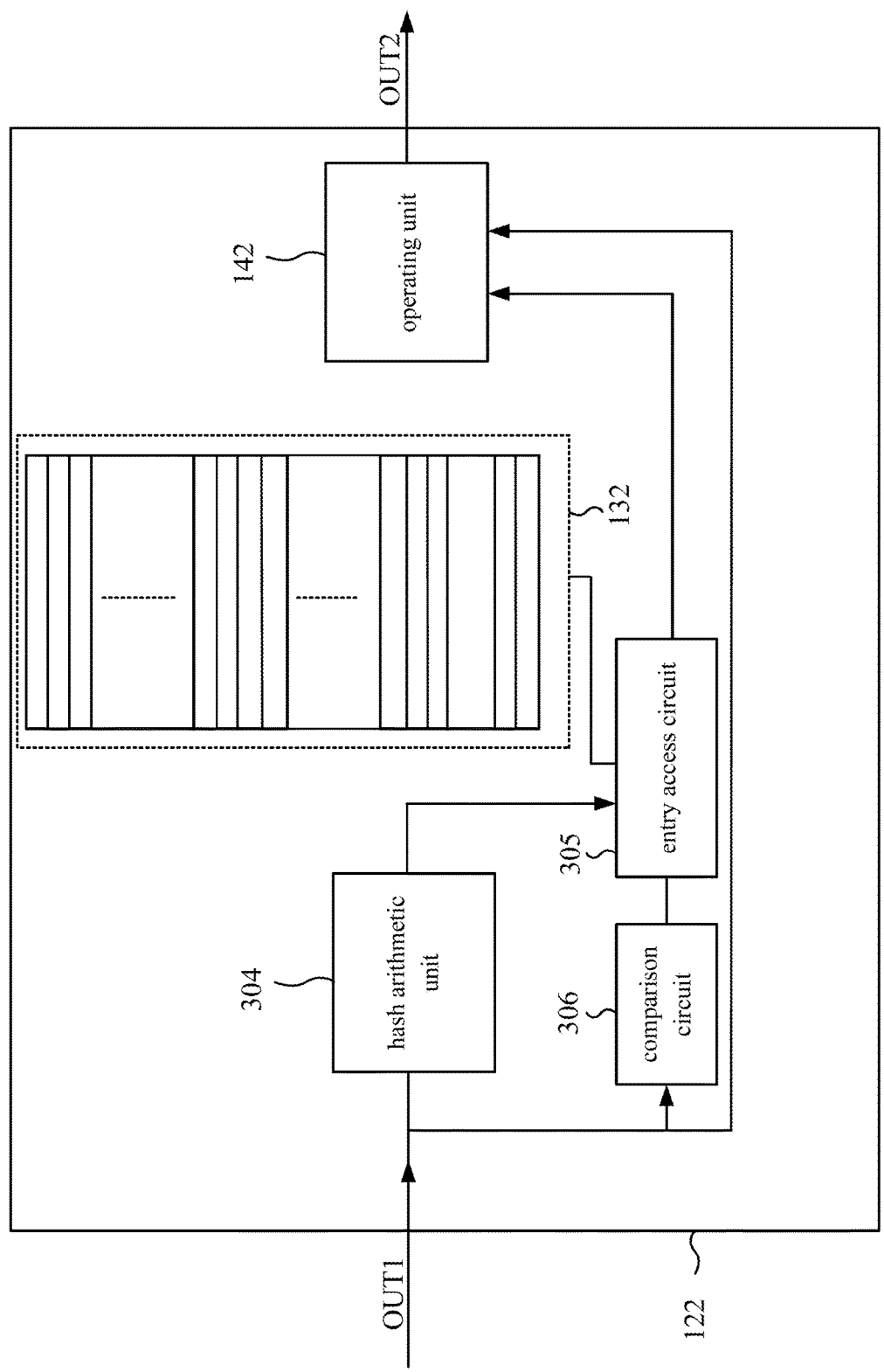
FIG. 3C is a schematic diagram of a processor according to an embodiment of this disclosure.
Figure 3D:
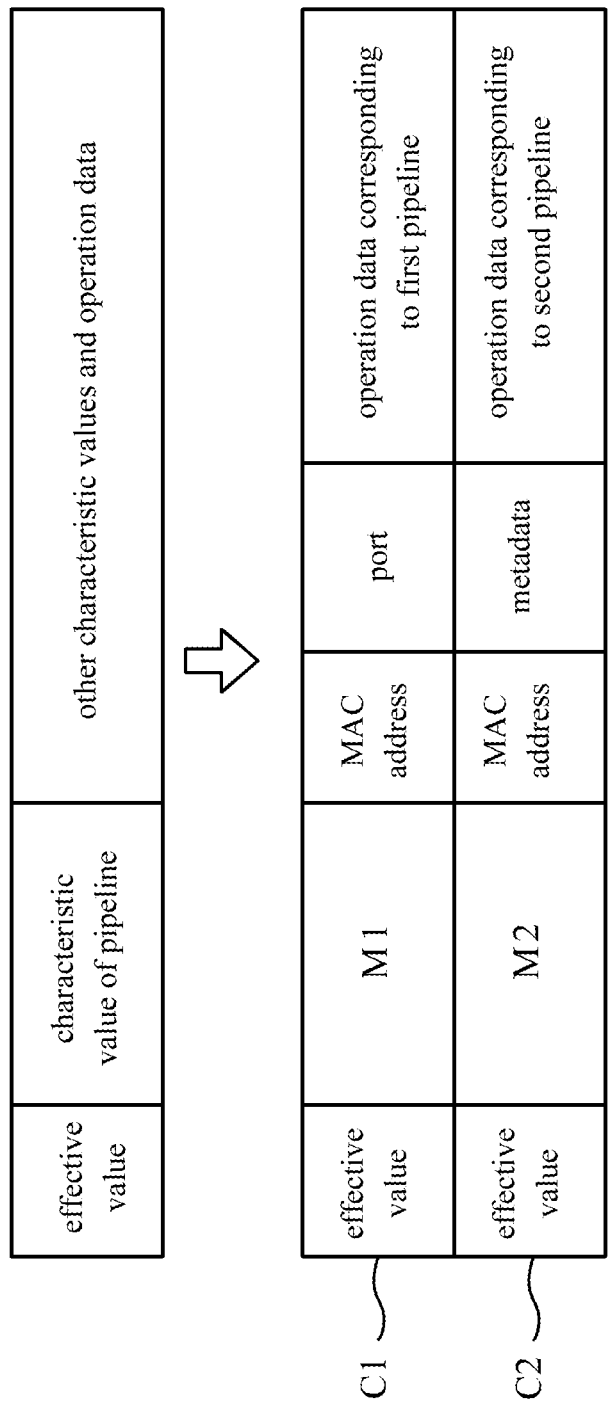
FIG. 3D is a schematic diagram of entries stored by a storage unit according to an embodiment of this disclosure.

FIG. 3C is a schematic diagram of the processor 122 according to an embodiment of this disclosure. The processor 122 comprises the storage unit 132, the operating unit 142, a hash arithmetic unit 304, an entry access circuit 305, and a comparison circuit 306. The entries stored by the storage unit 132 can be, for example, entries C1 and C2 depicted in FIG. 3D, which is a schematic diagram of the entries C1 and C2 stored by the storage unit 132 according to an embodiment of this disclosure. In contrast to the storage 131a depicted in FIGS. 3A and 3B, the entries C1 and C2 of the storage unit 132 contain not only characteristic values of pipelines but also the corresponding operation data. That is, the entries C1 and C2 contain the characteristic values (effective value, characteristic value M1, MAC address, port, etc.) conforming with the first pipeline and the characteristic values (effective value, characteristic value M2, MAC address, metadata, etc.) conforming with the second pipeline respectively, and the entries C1 and C2 also contain the operation data conforming with the first pipeline and the operation data conforming with the second pipeline respectively.

The hash arithmetic unit 304 calculates a hash index according to packet characteristic values contained in an output data packet OUT1.

The entry access circuit 305 reads the corresponding entries from the storage unit 132 according to the hash index, outputs all the data or characteristic values of the corresponding entries to the comparison circuit 306, and selectively outputs all the data or operation data of the corresponding entries to the operating unit 142.

The comparison circuit 306 compares the output data packet OUT1 with a characteristic value of the read entry. If the two match, the entry access circuit 305 outputs all the data or operation data of the corresponding entries into the operating unit 142 for the operating unit 142 to process the output data packet OUT1 according to corresponding instructions/procedures of the operation data and to generate an output data packet OUT2.

In some embodiments, because the output data packet OUT1 contains the characteristic value M1 or M2 (which can be used to determine whether the output data packet OUT1 belongs to a traditional or an OpenFlow pipeline), the hash arithmetic unit 304 can calculate a hash index with the corresponding hash algorithm according to the characteristic values M1 and M2. In other words, for different pipelines, the hash algorithms used by the hash arithmetic unit 304 can be different or the same algorithms.

In some embodiments, the processor 122 is used for the Layer 2 Forwarding of traditional pipelines, and so the processor 122 can process two table lookups, i.e., table lookups for packet learning (SA learning) and Layer 2 Forwarding (L2 Forwarding by DA lookup). Correspondingly, the processor 122 processes two table lookups for the ingress flow table 1 of the OpenFlow pipeline, and the hash arithmetic unit 304 can calculate sequentially according to characteristic value combinations depicted in table 1, in which characteristic values g1-gm of the output data packet OUT1 contain at least one of the characteristic value combinations of table 1.

TABLE 1

Characteristic Value Combination Of Ingress Flow Table 1

(VID, SA) and (0, SA)
(VID, SA) and (VID, DA)
(VID, SA) and (0, DA)

TABLE 1-continued

Characteristic Value Combination Of Ingress Flow Table 1

(0, SA) and (VID, DA)
(0, SA) and (0, DA)
(VID, DA) and (0, DA)
(DA, SA) and (VID, SA)
(DA, SA) and (0, SA)
(DA, SA) and (VID, DA)
(DA, SA) and (0, DA)

In some embodiments, if both the two table lookups have a match, the processor 122 can further comprise a selective circuit (not shown in the figures) such as a register so as to select one of the matched entries as the entries output to the operating unit 142.

In some embodiments, the processor 123 processes Layer 3 Forwarding corresponding to traditional pipelines, in which the Layer 3 Forwarding can be divided into host routing and network routing. The host routing is obtained via processing two table lookups with a hash algorithm, and so the host routing part of the processor 123 is similar to the processor 122 depicted in FIG. 3C. On the other hand, because the network routing part of the processor 123 involves the simultaneous comparison of one or more indexes, the architecture of the network routing is similar to the architecture of the processor 121 depicted in FIGS. 3A and 3B. That is, the storage unit 133 can be substantially regarded as the host routing part comprising the hash algorithm and the network routing part.

Figure 3E:
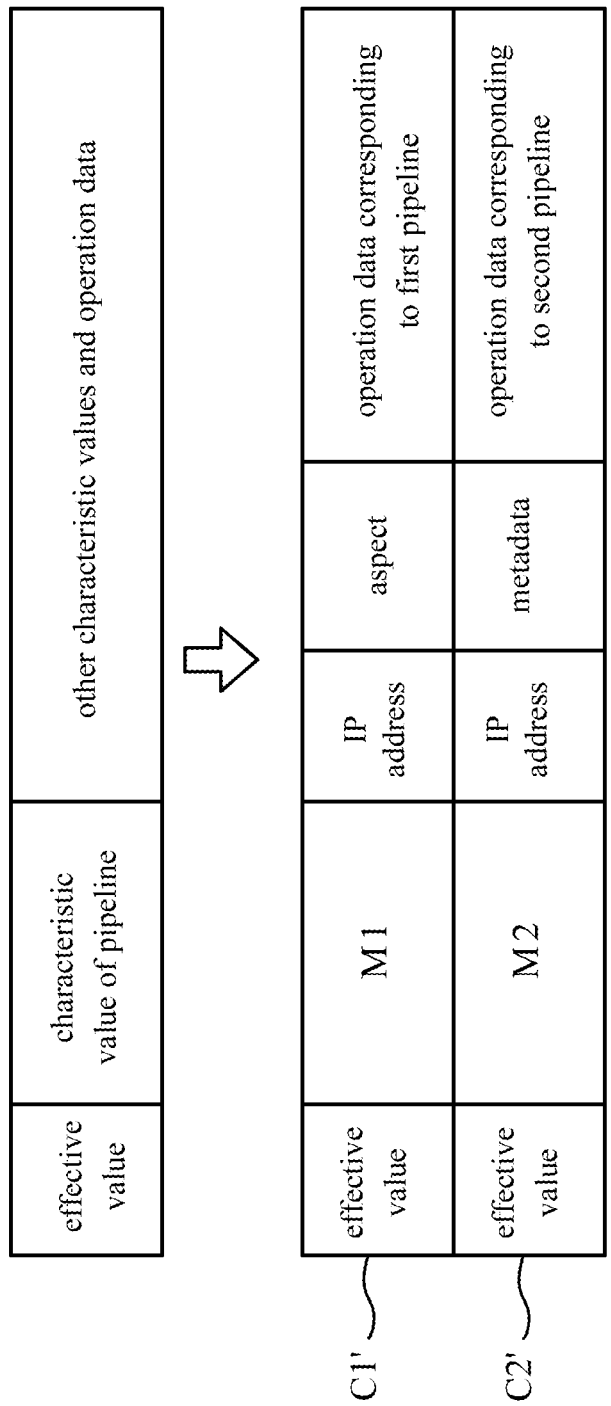
FIG. 3E is a schematic diagram of entries stored by a host routing part of a storage unit according to an embodiment of this disclosure.

Because the host routing part of the processor 123 is similar to the processor 122 depicted in FIG. 3C, the entries C1' and C2' stored by the network routing part of the storage unit 133 are similar to the entries C1 and C2 stored by the storage unit 132. FIG. 3E is a schematic diagram of the entries C1' and C2' stored by the host routing part of the storage unit 133 according to an embodiment of this disclosure. Similarly, the entry C1' and entry C2' of the host routing part of the storage unit 133 contain not only characteristic values of pipelines but the corresponding operation data thereof. That is, the entries C1' and C2' contain the characteristic values conforming with the first pipeline and the characteristic values conforming with the second pipeline respectively, and also contain the operation data conforming with the first pipeline and the operation data conforming with the second pipeline respectively.

In addition, because the host routing of Layer 3 Forwarding have two table lookups, the host routing part of the processor 123 is operable to process two table lookups for ingress flow table 2 of OpenFlow pipeline, and a corresponding hash arithmetic unit can calculate sequentially according to characteristic value combinations depicted in table 2, in which characteristic values g1-gm contain at least one of the characteristic value combinations of table 2.

TABLE 2

Characteristic Value Combination Of Ingress Flow Table 2

SIP and DIP
(SIP, DIP) and SIP
(SIP, DIP) and DIP

In some embodiments, output data packet OUT2 of the processor 122 contains characteristic values M1 and M2 so as to determine whether the output data packet OUT2 belongs to a traditional or an OpenFlow pipeline, and so the hash arithmetic unit 304 of the host routing part of the processor 123 can calculate a hash index with a corresponding hash algorithm according to the characteristic value M1 or M2. That is, for a traditional pipeline and an OpenFlow pipeline, the hash algorithms used by the hash arithmetic unit 304 of the processor 123 can be different or the same algorithms.

Figure 4:
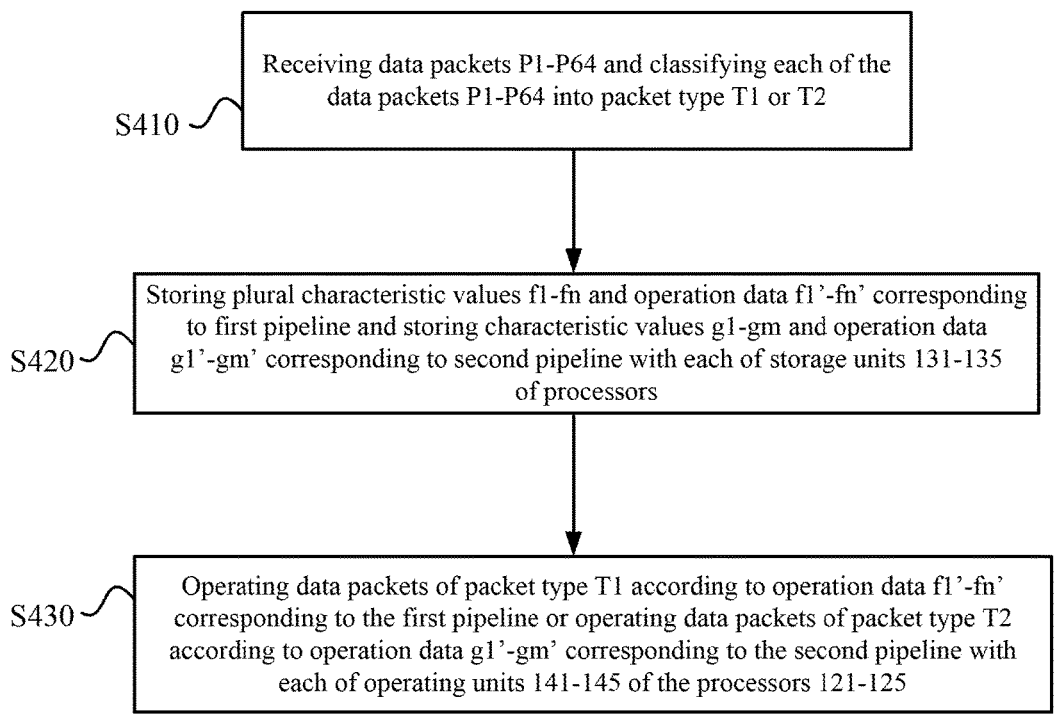
FIG. 4 is a flow chart of a control method according to an embodiment of this disclosure.

FIG. 4 is a flow chart of a control method 400 according to an embodiment of this disclosure, in which the control method 400 can be used in the network device 100 of FIG. 1, but is not limited thereto. The control method 400 comprises steps S410-S430.

In step S410, the network device 100 receives data packets P1-P64 and classifies each of the data packets P1-P64 into packet type T1 or T2.

In step S420, plural characteristic values f1-fn and operation data f1'-fn' conforming with a first pipeline, and characteristic values g1-gm and operation data g1'-gm' conforming with a second pipeline are stored with each of the storage units 131-135 of the processors 121-125.

In step S430, data packets of packet type T1 are operated according to operation data f1'-fn' conforming with the first pipeline or data packets of packet type T2 are operated according to operation data g1'-gm' conforming with the second pipeline with each of the operating units 141-145 of the processors 121-125.

It should be noted that, the number of pipelines is not limited in this regard.

In summary, with the sharing/multiplexing of a storage unit, entry access circuit, extraction circuit and hit result arbitrator of a processor, the chip area of a hybrid OpenFlow network device can be effectively minimized, thereby reducing power consumption and manufacturing costs.

What is claimed is:

1. A network device, comprising:
a packet classifying circuitry, configured to receive a data packet and to classify the data packet into a first packet type corresponding to a first pipeline or a second packet type corresponding to a second pipeline; and
a packet processing unit, comprising plural processors coupled in series, wherein each of the processors is configured to receive an output data packet from a previous stage and comprises:
a memory circuitry, configured to store plural first characteristic values and first operation data conforming with the first pipeline, and to store plural second characteristic values and second operation data conforming with the second pipeline, wherein the first characteristic values correspond to the first operation data respectively, and the second characteristic values correspond to the second operation data respectively; and
an operating unit, wherein if the output data packet from the previous stage is consistent with at least one of the first characteristic values, the operating unit is configured to process the output data packet in accordance with the corresponding first operation data of the at least one of the first characteristic values, and if the output data packet is consistent with at least one of the second characteristic values, the operating unit is configured to process the output data packet in accordance with the corresponding second operation data of the at least one of the second characteristic values,
wherein the memory circuitry of at least one of the processors comprises plural first entries and plural second entries, the first entries and the second entries storing the first characteristic values and the second characteristic values respectively, at least one packet characteristic value of the output data packet of the previous stage is compared with the first entries or the second entries to generate a comparison result, and the at least one of the processors comprises:
a hit result arbitrator configured to generate a match result in accordance with the comparison result,
wherein the at least one of the processors reads the corresponding first operation data or the corresponding second operation data in accordance with the match result, and the operating unit processes the output data packet of the previous stage in accordance with the corresponding first operation data or the corresponding second operation data.

2. The network device of claim 1, wherein the memory circuitry of the at least one of the processors comprises:
a first storage comprising the first entries and the second entries; and
a second storage configured to store the first operation data and the second operation data.

3. The network device of claim 2, wherein the at least one of the processors further comprises:
an entry access circuit configured to write/read the first characteristic values and the second characteristic values into/from the first storage, and to write/read the first operation data and the second operation data into/from the second storage.

4. The network device of claim 2, wherein the at least one of the processors further comprises:
an extraction circuit coupled to the first storage, configured to extract the at least one packet characteristic value of the output data packet of the previous stage, and to output the at least one packet characteristic value into the first storage.

5. The network device of claim 1, wherein the packet classifying circuitry classifies the output data packet into the first packet type or the second packet type in accordance with at least one of port information, virtual local area network information, an IP address, or a MAC address of the data packet.

6. A controlling method for a network device, wherein the network device receives a data packet and comprises a packet classifying circuitry comprising plural processors processing the data packet in series, each of the processors outputs an output data packet and comprises a memory circuitry, and the controlling method comprises:
classifying, by the packet classifying circuitry, the data packet into a first packet type corresponding to a first pipeline or a second packet type corresponding to a second pipeline;
storing, by the memory circuitry of a first processor of the processors, plural first characteristic values and first operation data conforming with the first pipeline, and storing, by the memory circuitry of the first processor, plural second characteristic values and second operation data conforming with the second pipeline, wherein the first characteristic values correspond to the first operation data respectively, the second characteristic values correspond to the second operation respectively, and the first characteristic values and the second characteristic values are stored to first entries and second entries of the memory circuitry of the first processor, respectively; and
if the output data packet from a previous stage of the first processor is the first packet type and consistent with at least one of the first characteristic values, processing the output data packet in accordance with the corresponding first operation data of the at least one of the first characteristic values, or if the output data packet from the previous stage of the first processor is the second packet type and consistent with at least one of the second characteristic values, processing the output data packet in accordance with the corresponding second operation data of the at least one of the second characteristic values, and the control method further comprises a first plurality of operations or a second plurality of operations, wherein the first plurality of operations comprise:
generating a match result in accordance with a first comparison result, wherein at least one packet characteristic value of the output data packet of the previous stage is compared with the first entries or the second entries to generate the first comparison result;
reading the corresponding first operation data or the corresponding second operation data in accordance with the match result; and
processing the output data packet from the previous stage of the first processor in accordance with the corresponding first operation data or the corresponding second operation data, and wherein the second plurality of operations comprise:
calculating, by a hash arithmetic circuitry of the first processor, a hash index in accordance with the at least one packet characteristic value of the output data packet from the previous stage of the first processor.

7. The controlling method of claim 6, wherein the memory circuitry of the first processor comprises a first storage and a second storage, the first storage comprises the first entries and the second entries, and the storing step comprises:
storing the first characteristic values and the second characteristic values to the first entries and the second entries of the first storage respectively; and
storing the first operation data and the second operation data to the second storage.

8. The controlling method of claim 7, further comprising:
writing/reading the first characteristic values and the second characteristic values into/from the first storage, and writing/reading the first operation data and the second operation data into/from the second storage.

9. The controlling method of claim 7, further comprising:
extracting the at least one packet characteristic value of the output data packet from the previous stage of the first processor, and outputting the at least one packet characteristic value into the first storage.

10. The controlling method of claim 6, wherein the memory circuitry of the first processor comprises a first storage, the first storage includes the first entries and the second entries, and the storing step further comprises:
storing the corresponding first operation data to the first entries; and
storing the corresponding second operation data to the second entries.

11. The controlling method of claim 10, wherein the second plurality of operations further comprise:
reading a selected entry from the first storage in accordance with the hash index, and selectively outputting the first operation data or the second operation data of the selected entry.

12. The controlling method of claim 11, further comprising:

receiving a packet characteristic value of the selected entry, and determining whether an output packet characteristic value of the output data packet from the previous stage is the same as the packet characteristic value of the selected entry, so as to output a second comparison result;
outputting a selected operation data of the selected entry in accordance with the second comparison result; and
processing the output data packet in accordance with corresponding instruction of the selected operation data.

13. The controlling method of claim 6, wherein the classifying step further comprises:
classifying the output data packet into the first packet type or the second packet type in accordance with at least one of port information, virtual local area network information, an IP address, or a MAC address of the output data packet.

14. A network device, comprising:
a packet classifying circuitry, configured to receive a data packet and to classify the data packet into a first packet type corresponding to a first pipeline or a second packet type corresponding to a second pipeline; and
a packet processing unit, comprising plural processors coupled in series, wherein each of the processors is configured to receive an output data packet from a previous stage and comprises:
a storage circuitry, configured to store plural first characteristic values and first operation data conforming with the first pipeline, and to store plural second characteristic values and second operation data conforming with the second pipeline, wherein the first characteristic values correspond to the first operation data respectively, and the second characteristic values correspond to the second operation data respectively; and
an operating unit, wherein if the output data packet from the previous stage is consistent with at least one of the first characteristic values, the operating unit is configured to process the output data packet in accordance with the corresponding first operation data of the at least one of the first characteristic values, and if the output data packet is consistent with at least one of the second characteristic values, the operating unit is configured to process the output data packet in accordance with the corresponding second operation data of the at least one of the second characteristic values, wherein each of at least one of the processors further comprises:
a hash arithmetic circuitry configured to receive the output data packet of the previous stage, and to calculate a hash index in accordance with at least one packet characteristic value of the output data packet.

15. The network device of claim 14, wherein the storage circuitry of the at least one of the processors comprises a first storage, the first storage comprises plural first entries and plural second entries, the first entries are configured to store the first characteristic values and the corresponding first operation data, and the second entries are configured to store the second characteristic values and the corresponding second operation data.

16. The network device of claim 15, wherein each of the at least one of the processors further comprises:
an entry access circuit configured to read a selected entry from the first storage in accordance with the hash index, and to selectively output the first operation data or the second operation data of the selected entry to the operating unit.

17. The network device of claim 16, wherein each of the at least one of the processors further comprises:
a comparison circuit configured to receive a packet characteristic value of the selected entry from the entry access circuit, and to determine whether an output packet characteristic value of the output data packet of the previous stage is the same as the packet characteristic value, so as to output a comparison result;
wherein the entry access circuit outputs a selected operation data of the selected entry in accordance with the comparison result, and the operating unit processes the output data packet of the previous stage in accordance with corresponding instructions of the selected operation data.

18. The network device of claim 14, wherein the packet classifying circuitry classifies the output data packet into the first packet type or the second packet type in accordance with at least one of port information, virtual local area network information, an IP address, or a MAC address of the data packet.

\* \* \* \* \*